US011507936B2

(12) United States Patent
Bhoiwala et al.

(10) Patent No.: US 11,507,936 B2
(45) Date of Patent: Nov. 22, 2022

(54) PAYMENT TRANSACTION SYSTEMS AND METHODS BY DYNAMICALLY PUSHING DATA TO PAYMENT SERVICE PROVIDER

(71) Applicant: MASTERCARD INTERNATIONAL INCORPORATED, Purchase, NY (US)

(72) Inventors: Kinjal Bhoiwala, Pune (IN); Amit Kumar Prabhat, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 395 days.

(21) Appl. No.: 16/853,389

(22) Filed: Apr. 20, 2020

(65) Prior Publication Data
US 2020/0356978 A1 Nov. 12, 2020

(30) Foreign Application Priority Data
May 10, 2019 (SG) ............................ 10201904239Q

(51) Int. Cl.
*G06Q 20/32* (2012.01)
*G06F 16/955* (2019.01)
(Continued)

(52) U.S. Cl.
CPC ....... *G06Q 20/326* (2020.05); *G06F 16/9566* (2019.01); *G06Q 20/367* (2013.01);
(Continued)

(58) Field of Classification Search
CPC ............. G06Q 20/326; G06Q 20/3825; G06Q 20/3829; G06Q 30/18; G06Q 2220/00; G06F 16/9566; H04L 2209/56
(Continued)

(56) References Cited

U.S. PATENT DOCUMENTS

2015/0332230 A1* 11/2015 Gaines ................. G06Q 20/322
 705/27.1
2018/0103109 A1* 4/2018 Jaladi ................... G06Q 20/322

OTHER PUBLICATIONS

Pescoe, https://www.nerdwallet.com/article/small-business/payment-service-providers, Dec. 15, 2021, 12 pages (Year: 2021).*
(Continued)

*Primary Examiner* — James D Nigh
(74) *Attorney, Agent, or Firm* — Pillsbury Winthrop Shaw Pittman LLP

(57) ABSTRACT

Embodiments provide payment transaction methods, and systems by dynamically pushing payment transaction data to a Payment Service Provider (PSP). Method includes receiving, by a server system associated with a payment network, a payment transaction request including a payment transaction data and a PSP identifier (ID) of PSP during a payment transaction initiated from a user device using a merchant application. The method includes fetching, by the server system, a corresponding Uniform Resource Locator (URL) of the PSP using the PSP ID of the PSP from a merchant portal database. The merchant portal database at least includes a list of one or more URLs stored against respective one or more PSP IDs pre-generated based on linking respective one or more PSPs to a merchant profile. The method includes sending, by the server system, the payment transaction data to a PSP server using the corresponding URL for processing the payment transaction.

20 Claims, 11 Drawing Sheets

(51) Int. Cl.
*G06Q 20/36* (2012.01)
*G06Q 20/38* (2012.01)
*G06Q 30/00* (2012.01)
*H04L 9/30* (2006.01)

(52) U.S. Cl.
CPC ..... *G06Q 20/3825* (2013.01); *G06Q 20/3829* (2013.01); *G06Q 30/018* (2013.01); *H04L 9/30* (2013.01); *G06Q 2220/00* (2013.01); *H04L 2209/56* (2013.01)

(58) Field of Classification Search
USPC .......................................................... 705/71
See application file for complete search history.

(56) References Cited

OTHER PUBLICATIONS

"Verified by Visa Acquirer and Merchant Implementation Guide U.S. Region", May 2011, 114 pages (Year: 2011).*

\* cited by examiner

PAYMENT TRANSACTION SYSTEMS AND METHODS BY DYNAMICALLY PUSHING DATA TO PAYMENT SERVICE PROVIDER

CROSS-REFERENCE TO RELATED APPLICATIONS

This application claims priority to Singaporean Application Serial No. 10201904239Q, filed May 10, 2019, which is incorporated herein by reference in its entirety.

TECHNICAL FIELD

The present disclosure relates to processing electronic transactions for payment of goods and/or services in a payment transaction management network and, more particularly to, methods and systems for dynamically pushing the payment transaction data to a Payment Service Provider (PSP) in online financial transactions.

BACKGROUND

Generally, purchasing a product over the Internet involves the electronic submission of a payment card number (e.g., credit cards and debit cards) on a merchant e-commerce website, an electronic communication to the payment card issuer for authorization of a total purchase price, and an electronic debiting of the customer's account when the purchase process is completed. Alternatively, consumers digitize the payment cards into the mobile phones, wearable devices etc., using technologies such as tokenization, Card-on-File (COF) transactions, digital wallets and the like. Nowadays, there exists multiple digital wallet platforms that facilitate dedicated digital wallet applications (hereinafter referred to as wallet applications) using which the user can perform safe and secure card-less payment transactions.

Payment interchange networks (hereinafter alternatively referred to payment network) facilitate the exchange of financial transaction data between financial institutions that are members/customers of the payment interchange networks for processing payment card based transactions. Examples of the members include the issuer banks, the acquirer banks, the wallet servers and the like. A payment service provider (PSP) (another example of a member of the payment network) offers online services to merchants for accepting electronic payments by a variety of payment methods including credit card, bank-based payments such as bank transfer, and online banking. Non-Payment Card Industry (PCI) compliant merchants are unauthorized to handle the payment transactions themselves. Such merchants need to link with the PSP to process the payment transactions on behalf of the merchants.

For example, if the user has selected a wallet application at the time of checkout on the merchant e-commerce website, the wallet application needs to connect with the PSP to process the payment transaction. Currently, the wallet application generates a transaction ID for the merchant. The merchant sends the transaction ID to the PSP. The PSP sends this transaction ID back to the wallet application for receiving the payment transaction data such as credit card numbers and the like. Further, the merchant or the wallet application has to register the PSP on the payment network for processing each payment transaction. Specific codes (e.g., identifiers of the PSP) need to be manually entered on respective servers for registering the PSP.

There may be a scenario when the merchant may have a selection of specific PSPs for processing a particular type of payment transactions. Further, if the merchant wants to communicate to multiple PSPs, or if there are multiple merchants who want to register their preferred PSPs on the payment network, a huge amount of changes is required at the infrastructure level and in the deployment process. This is a very cumbersome task for the merchants and the end-user experience may further get deteriorated because of the time taken to complete the payment transaction.

Accordingly, techniques are desired for registering the PSP without the need of making changes at the infrastructure level in the payment network and dynamically sending the payment transaction data to the PSP at run-time. Also, the improvements are needed in the process where the PSP does not need to ask for the payment transaction data from the wallet application or the merchant application, and rather it receives the data automatically from the corresponding entity at run-time.

SUMMARY

Various embodiments of the present disclosure provide systems, methods, electronic devices and computer program products for pushing the payment transaction data to a Payment Service Provider (PSP).

In an embodiment, a computer-implemented method is disclosed. The method includes receiving, by a server system associated with a payment network, a payment transaction request. The payment transaction request at least includes a payment transaction data and a PSP identifier (ID) of a PSP during a payment transaction initiated from a user device using a merchant application. The method includes fetching, by the server system, a corresponding Uniform Resource Locator (URL) of the PSP using the PSP ID of the PSP from a merchant portal database. The merchant portal database at least includes a list of one or more URLs stored against respective one or more PSP IDs pre-generated based on linking respective one or more PSPs to a merchant profile. The method further includes sending, by the server system, the payment transaction data to a PSP server using the corresponding URL for processing the payment transaction.

In another embodiment, a server system is provided. The server system includes a communication interface configured to receive a payment transaction request. The payment transaction request at least includes a payment transaction data and a PSP ID of a PSP during a payment transaction initiated from a user device using a merchant application. The server system further includes a memory comprising executable instructions and a processor communicably coupled to the communication interface. The processor is configured to execute the instructions to cause the server system at least to fetch a corresponding URL of the PSP using the PSP ID of the PSP from a merchant portal database. The merchant portal database at least includes a list of one or more URLs stored against respective one or more PSP IDs pre-generated based on linking respective one or more PSPs to a merchant profile. The processor is further configured to execute the instructions to cause the server system to send the payment transaction data to a PSP server using the corresponding URL for processing the payment transaction.

In yet another embodiment, a computer-implemented method is disclosed. The method includes facilitating, by a server system associated with a payment network, a merchant portal on a merchant device. The method includes receiving, by the server system, a request to create a merchant profile by a merchant on the merchant portal. The creation of the merchant profile facilitates integration of a merchant application with a wallet application. The method further includes receiving, by the server system, a request to register one or more corresponding URLs of one or more PSPs by the merchant on the merchant portal. The method includes facilitating, by the server system, linking of the one or more PSPs to the merchant profile. The method includes generating, by the server system, one or more PSP IDs based on the linking of respective one or more PSPs to the merchant profile. Furthermore, the method includes storing, by the server system, the one or more corresponding URLs of the one or more PSPs against the one or more PSP IDs. The wallet application is configured to fetch a corresponding URL of the one or more corresponding URLs of a PSP of the one or more PSPs using a respective PSP ID of the one or more PSP IDs for processing a payment transaction.

In yet another embodiment, a proxy server in a payment network is disclosed. The server system includes a communication module configured to receive a communication request comprising a payment transaction data being part of a payment transaction request received during a payment transaction initiated from a user device using a merchant application. The communication module is further configured to receive a corresponding URL of a PSP. The corresponding URL is fetched using a PSP ID of the respective PSP from a merchant portal database. The PSP ID is pre-generated based on linking the respective PSP to a merchant profile. The server system further includes a storage module comprising executable instructions and a processing module communicably coupled to the communication module. The processing module is configured to execute the instructions to cause the server system at least to parse the communication request to extract the corresponding URL of the PSP. The processing module is further configured to execute the instructions to cause the server system to send the payment transaction data to a PSP server using the corresponding URL for processing the payment transaction.

BRIEF DESCRIPTION OF THE FIGURES

For a more complete understanding of example embodiments of the present technology, reference is now made to the following descriptions taken in connection with the accompanying drawings in which.

Figure 1:
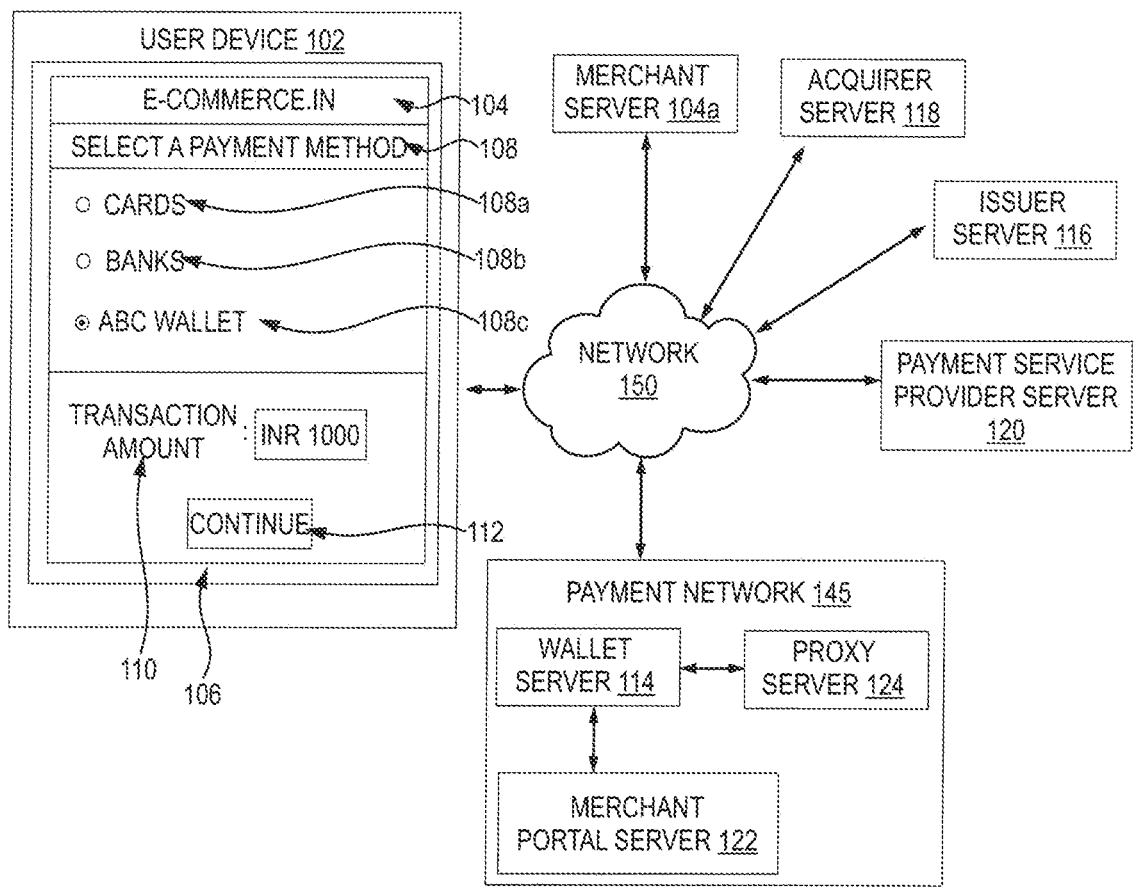
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refer to a financial account that is used to fund the financial transaction (interchangeably referred to as "payment transaction"). Examples of the payment account include, but is not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by PayPal®, and the like.

The term "payment network", used throughout the description, refer to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, e-wallet, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data stored in a user device, where the data is associated with payment account such that the data can be used to process the financial transaction between the payment account and a merchant's financial account.

Overview

Various example embodiments of the present disclosure provide methods, systems, user devices and computer program products for dynamically pushing payment transaction data to a Payment Service Provider (PSP).

In various example embodiments, the present disclosure facilitates a server system in a payment network that receives a payment transaction request initiated from a user device using a merchant application facilitated by a merchant server for purchasing a product or a service. The payment transaction request includes a payment transaction data and a PSP ID of a PSP. The payment transaction data may include information such as a payment card number of the payment card, expiry date, a Card Verification Value (CVV) number and the like. A wallet server (an example of the server system) is configured to facilitate a wallet application for receiving the payment transaction request. The wallet application is integrated with the merchant application by a merchant upon creating a merchant profile on a merchant portal (e.g., a User Interface) facilitated by a merchant portal server (another example of the server system).

In one embodiment, a plurality of PSPs are enabled to register themselves with the payment network using unique respective Uniform Resource Locators (URLs) on the merchant portal. In another embodiment, the merchant is enabled to register the one or more of his preferred PSPs using their corresponding one or more URLs on the merchant portal. The URL is basically a PSP endpoint exposed by the PSP on which the payment transaction data is pushed. Each PSP has its own endpoint which is onboarded on the merchant portal. A list of one or more PSP IDs is generated based on linking one or more PSPs to the merchant profile on the merchant portal. These PSP IDs are stored in a merchant portal database of the merchant portal server. The wallet server is configured to fetch a corresponding URL of the PSP using the PSP ID received in the payment transaction request from the merchant portal database. The wallet server is further configured to fetch a PSP public key of the PSP from the merchant portal database. The PSP public key is part of a PSP asymmetric key pair and it may be received along with the URL at the time of onboarding the PSP on the merchant portal. The wallet server is configured to encrypt the payment transaction data using the PSP public key.

The encrypted payment transaction data is signed using a server private key being part of a server asymmetric key pair. In one embodiment, the wallet server is configured to send the corresponding URL and the signed and encrypted payment transaction data (hereinafter combinedly referred to as a communication request) to a proxy server (yet another example of the server system). The proxy server is configured to parse the communication request to extract the corresponding URL. The proxy server is further configured to send the payment transaction data to the PSP using the corresponding URL for processing the payment transaction. In another embodiment, the wallet server is configured to send the communication request directly to the PSP server for processing the payment transaction. The PSP server verifies the signed encrypted payment transaction data using a server public key being part of the server asymmetric key pair and received at the time of onboarding on the merchant portal. The PSP server further decrypts the encrypted payment transaction data using a PSP private key being part of the PSP asymmetric key pair.

The PSP server extracts payment card information of the payment card from the payment transaction data and sends it to an issuer server for authorization. The PSP server may also send the transaction amount to the issuer server to verify sufficient funds present in an issuer account of the user. Once, the PSP server receives confirmation of authorization of the payment card information from the issuer server, the PSP server completes the payment transaction by transferring funds from the issuer account of user to the merchant account. Thereafter, the PSP server is configured to generate a transaction ID of the processed payment transaction and send the transaction ID of the processed payment transaction to the merchant server via the proxy server.

FIG. 1 illustrates an exemplary representation of an environment 100 related to at least some example embodiments of the present disclosure.

In the illustrated environment 100, a user device 102 of a user (not shown) is shown to have installed a merchant application 104 represented as 'e-commerce.in'. Examples of the user device 102 include, but are not limited to, a personal computer (PC), a mobile phone, a tablet device, a Personal Digital Assistant (PDA), a voice activated assistant, a Virtual Reality (VR) device, a smartphone and a laptop. The merchant application 104 is facilitated by a merchant server 104a on the user device 102 via a merchant interface. Examples of the merchant interface include a mobile application or a web application. A checkout page 106 is shown where the user is enabled to select a payment method 108 from the one more payment method options exemplarily provisioned therein. The options include 'cards' 108a (e.g., debit cards, credit cards), 'banks' 108b (e.g., net banking) and 'ABC wallet' 108c (e.g., digital wallets). The 'ABC wallet' 108c is shown as selected for the preferred payment method by the user for purchasing a product or a service from the merchant application 104 'e-commerce.in'. The checkout page 106 also includes a transaction amount 110 represented as '1000 INR' to be paid for the product or service to be purchased. Upon selection of the preferred payment method, the user clicks a button 112 labeled as 'Continue'.

The clicking of the button 112 redirects the user to a UI (not shown) of the 'ABC wallet' 108c. The 'ABC wallet' 108c is an example of a digital wallet application (hereinafter referred to as wallet application 108c) facilitated by a digital wallet server 114 (hereinafter referred to as wallet server 114) through a digital platform. The wallet application 108c typically requires authentication/authorization of the wallet user at the time of purchase. For example, using a UI facilitated by the wallet server 114, the user is enabled to enter a username, a password, a PIN or a fingerprint to authenticate himself.

During enrollment, the wallet application 108c requires a user to provide sensitive information such as personal information, contact information, financial information and the like. In at least one embodiment, the wallet server 114 is associated with a payment network 145. The payment network 145 may be used by the payment cards issuing authorities as a payment interchange network. Examples of payment interchange network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.). Further, Masterpass™ is a digital wallet (e.g., the 'ABC wallet' 108c) facilitated by Mastercard® payment system interchange network that allows the user to check out by storing payment and shipping information in one secure location for a simple, fast, and secure checkout experience on online purchase as well as in shops. For example, instead of filling in or typing his or her e-mail address and a password or provide other information to proceed on a checkout page, the user may be prompted to directly sign into a particular Masterpass™ wallet for selecting a particular payment card account and/or shipping address and the like, to complete the purchase.

The 'ABC wallet' 108c/the wallet application 108c may include at least one payment account therein (e.g., credit card, debit card, check card, etc.) that is issued by an issuer (e.g., on an issuer server 116) which may correspond to a bank, a credit agency, or other type of financial institution. The issuer server 116 is associated with a financial institution normally called as an "issuer bank" or "issuing bank" or simply "issuer", in which the user may have an account, which issues a payment card, such as a credit card or a debit card. The issuer server 116 also facilitates authorization of the payment card information associated with the payment card of the user for completing a payment transaction.

To accept payment, the merchant (not shown) must normally establish an account with a financial institution that is part of the financial payment system. This financial institution is usually called the "merchant bank" or the "acquiring bank" or "acquirer bank" or simply "acquirer". The acquirer server 118 is associated with the acquirer bank.

In a non-limiting example, if the merchant is a non-PCI compliant merchant, he is unauthorized to process the payment transaction by himself. In such instances, a PSP processes the payment transaction on behalf of the merchant. It should also be noted that a PCI compliant merchant can also opt for the services of a PSP to process the payment transactions. Therefore, the wallet application i.e., the 'ABC wallet' 108c needs to send the payment transaction data (hereinafter alternatively referred to as payment data) to a PSP server such as a PSP server 120. Accordingly, the PSP of the PSP server 120 needs to be registered with the payment network 145 to process the payment transaction.

A merchant portal server 122 associated with the payment network 145 is configured to facilitate a merchant portal for registering the PSP using a corresponding URL. The merchant portal server 122 is also configured to generate a PSP ID of the linked PSP to a merchant profile. The merchant server 104a sends the PSP ID along with the payment transaction data (hereinafter collectively referred to as payment transaction request) to the wallet server 114. The wallet server 114 fetches the URL of the PSP (i.e., the PSP endpoint) using the PSP ID from the merchant portal during the payment transaction. The wallet server 114 further passes the payment transaction data and the URL to a proxy server 124 associated with the payment network 145. The proxy server 124 further pushes the payment transaction data to the PSP server 120 using the URL for processing the payment transaction.

Using the payment network 145, the computers of the proxy server 124 or the wallet server 114 communicate with the computers of the PSP server 120. The PSP server 120 further communicates with the issuer server 116 to determine whether the user's account is in good standing and whether the purchase is covered by the user's available account balance. Based on these determinations, authorization of the payment transaction is declined or accepted. When the authorization is accepted, the available balance of the user's account is decreased. After a transaction is captured, the transaction is settled between the merchant, the acquirer and the issuer. Settlement refers to the transfer of financial data or funds between the merchant's account, the acquirer, and the issuer, related to the transaction.

The user device 102, the merchant server 104a, the issuer server 116, the acquirer server 118, the PSP server 120, the wallet server 114, the merchant portal server 122 and the proxy server 124 communicate with one another using a communication network 150. The communication network 150 may be a centralized network or may comprise a plurality of sub-networks that may offer a direct communication or may offer indirect communication. Examples of the communication network 150 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 150 may be or include the Internet, intranets, extranets, microwave networks, satellite communications, cellular systems, personal communication services ("PCS"), infrared communications, global area networks, or other suitable networks, etc., or any combination of two or more such networks.

In existing (conventional) payment transaction methods (i.e., not in accordance with the present disclosure), a wallet server generates a transaction ID for the merchant. A merchant server sends the transaction ID to a PSP server. The PSP server sends this transaction ID back to the wallet server for receiving the payment transaction data. Further, for registering a new PSP with the payment network for processing a new payment transaction, specific codes (e.g., the URL of the PSP) need to be manually entered on a proxy server. The changes required at the infrastructure level delays the deployment process. In contrast to existing payment transaction methods, by using the embodiments of the present disclosure, the PSP is dynamically selected during the payment transaction using the PSP ID for sending the payment transaction data by the proxy server or the wallet server. Therefore, the transaction processing time reduces tremendously which further enhances the overall end-user experience. Some non-exhaustive example embodiments of dynamically pushing the payment transactions data to the PSP are described with reference to the following description, particularly with reference to FIGS. 2 to 13.

Figure 2:
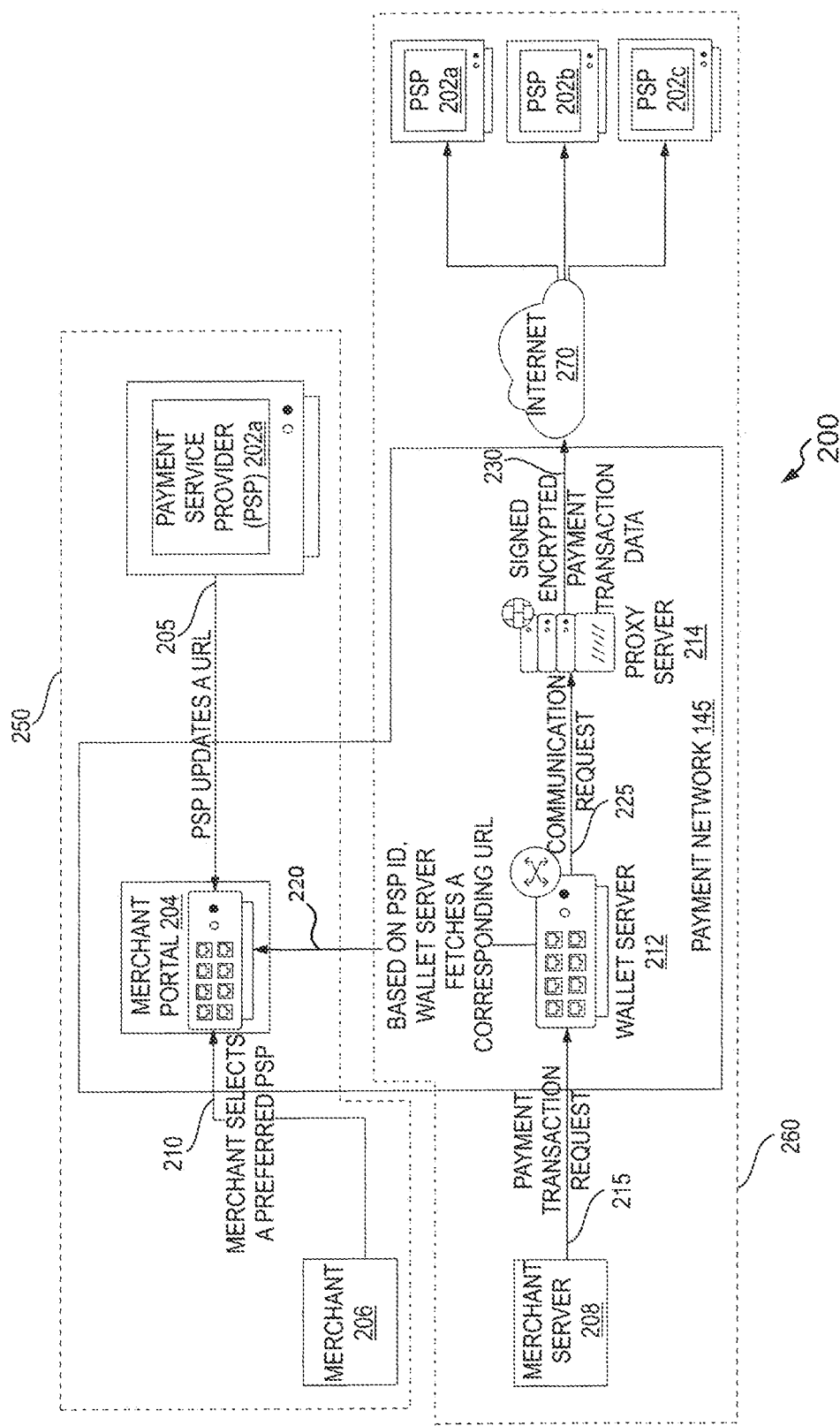
FIG. 2 represents a simplified schematic flow diagram of pushing payment transaction data to a Payment Service Provider (PSP), in accordance with an example embodiment.

FIG. 2 represents a simplified schematic flow diagram 200 of pushing payment transaction data to a PSP, in accordance with an example embodiment. More specifically, the flow diagram 200 represents two flows separated by dashed boxes 250 and 260.

The dashed box 250 represents pre-registration/onboarding of a PSP 202a and linking of the PSP 202a on a merchant portal 204 of the payment network 145 by a merchant 206. In an example embodiment, the PSP 202a may be associated with the PSP server 120 of FIG. 1. In an embodiment, the merchant portal 204 may be facilitated by the merchant portal server 122 of FIG. 1. In another embodiment, the merchant portal 204 may be facilitated by the wallet server 114 of FIG. 1.

As shown, at 205, the PSP 202a sends a corresponding URL to the merchant portal 204 via the PSP server 120. In an example embodiment, the URL is a webhook URL uniquely associated with the PSP 202a. Using the webhook URL, the PSP 202a only receives information/data from when an event occurs, for example, when a payment transaction is initiated unlike a normal URL which continuously has to poll every couple of minutes to find out if there is a new information.

At 210, the merchant 206 selects the PSP 202a as a preferred PSP for a prospective payment transaction on the merchant portal 204. In order to select the preferred PSP, the merchant 206 needs to create a merchant profile on the merchant portal 204. The creation of the merchant profile results in linking the merchant application with the wallet application. Further, selection of a PSP ends in linking the PSP to the merchant profile and thereby generating a respective PSP ID by the merchant portal 204. For example, the PSP ID for linking the PSP 202a with the merchant profile on the merchant portal 204 is '12345AB'. The PSP ID is stored against the webhook URL of the PSP 202a in a merchant portal database of the merchant portal server 122. Onboarding and linking of a PSP on a merchant profile is further explained in detail with reference to FIGS. 3A, 3B and FIG. 4.

The dashed box 260 represents a flow during an actual payment transaction. When a user checks out on a merchant application based on selecting a wallet application as the payment method, at 215, a corresponding wallet server 212 receives a payment transaction request from a merchant server 208. The request includes the payment transaction data and the PSP ID pre-generated as explained in the previous flow indicated by the dashed box 250. At 220, the wallet server 212 fetches the corresponding URL (hereinafter alternatively referred to as webhook URL) of the PSP 202a from the merchant portal database of the merchant portal 204 using the PSP ID received in the payment transaction request.

At 225, the wallet server 212 sends a communication request to a proxy server 214. The communication request includes the payment transaction data and the URL. The proxy server 214 is shown to be connected to a plurality of PSPs such as the PSP 202a, a PSP 202b, and a PSP 202c over a communication network such as Internet 270. As the proxy server 214 has received the URL of the PSP 202a from the wallet server 212, the proxy server 214 pushes the payment transaction data to the PSP 202a using the URL to process the payment transaction. (see, 230). The process of dynamically pushing the payment transaction data to the PSP 202a completes at step 230.

In an embodiment, the PSP 202a upon receiving the payment transaction data sends the payment transaction data to an issuer server (e.g., the issuer server 116 of FIG. 1) for verifying the user's account balance. The PSP 202a transfers the funds from the user account to the merchant account by communicating with an acquirer server (e.g., the acquirer server 118 of FIG. 1) of the merchant based on receiving confirmation from the issuer server. Once the payment transaction is processed, the merchant is notified using a transaction ID generated by the PSP 202a. The sequence of operations of the flow diagram 200 may not be necessarily executed in the same order as they are presented. Further, one or more operations may be grouped together and performed in form of a single step, or one operation may have several sub-steps that may be performed in parallel or in sequential manner.

Thus, a technical effect of dynamically pushing the payment transaction data to the PSP 202a as explained hereinabove results in a time saving solution for the merchants as well as the PSPs. The merchant is specifically saved from the tasks of managing communications with the PSP during the payment transactions and yet get the payment transactions processed by the PSP. Further, as the corresponding URL of the PSP 202a is fetched by the wallet server 212 dynamically from the merchant portal 204 during a payment transaction, the code changings i.e., manually entering the URL on the wallet server 212 and the proxy server 214 during the transaction to push the payment transaction data to the PSP 202a is completely eliminated. As the dependency on the changes at the infrastructure level is removed, the release management cost is fully saved.

Figure 3A:
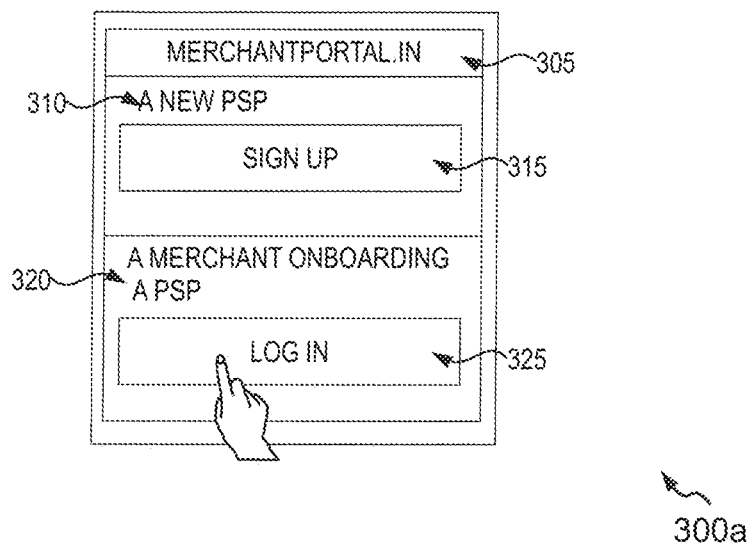
FIGS. 3A & 3B represent simplified schematic representations of example User Interfaces (UIs) of a merchant portal for registering a PSP with a payment network, in accordance with an example embodiment.
Figure 3B:
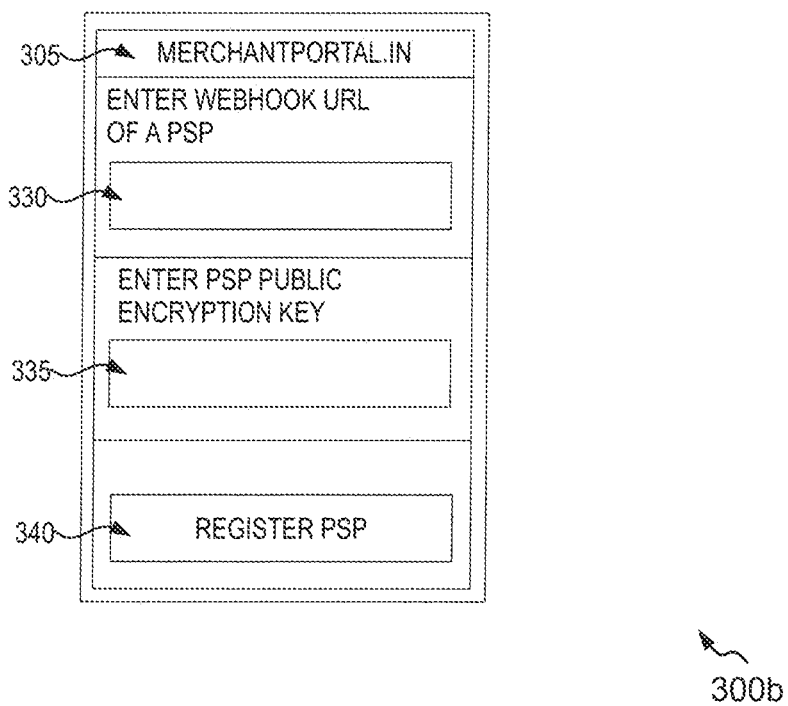

FIGS. 3A & 3B represent simplified schematic representations of example User Interfaces (UIs) 300a and 300b of a merchant portal for registering a PSP with a payment network, in accordance with an example embodiment. FIG. 3A represents an example UI 300a of a merchant portal website 305 (e.g., merchantportal. in 305 and hereinafter referred to as merchant portal 305) configured to display two options of onboarding a PSP, in accordance with an example embodiment of the present disclosure. A header 310 displaying text 'a new PSP' is accompanied by a button 315 labeled as 'sign-up'. If a PSP is onboarding itself on the merchant portal 305, an authorized user of the PSP may click on the button 315. The user may be directed to a UI (not shown) to enter information of the PSP such as an email, a password and the like. The user may further be directed to another UI (not shown) where the user may be enabled to enter the corresponding URL in a form field and click on a button labeled 'submit' to register on the merchant portal 305.

The UI 300a further includes another header 320 displaying text 'a merchant onboarding a PSP' accompanied by a button 325 labeled as 'Login'. This is a scenario when a merchant has already created a merchant profile on the merchant portal 305 based on providing personal information, an email, a password etc., for the purpose of integrating the merchant application (e.g., the merchant application 104 of FIG. 1) with the wallet application (e.g., the wallet application 108c of FIG. 1). Upon clicking the button 325, the merchant is redirected to another UI for example the UI 300b of FIG. 3B. The UI 300b represents a form field 330 using which the webhook URL of a PSP is entered by the merchant on the merchant portal 305. For example, the webhook URL of a PSP is '(https://)mypspserviceprovider(.)com(/)pspdata' (omitting the parentheses). In an example embodiment, the webhook URL/the PSP endpoint may be required to support Transport Layer Security (TLS) version 1.2 or higher. The TLS protocol aims primarily to provide privacy and data integrity between two or more communicating computer applications, for example, in this case the proxy server 124 and the PSP server 120 during the actual payment transaction. The UI 300b further displays another form field 335 for entering a PSP public key provided by the PSP to the merchant at an earlier stage. The PSP public key is part of the PSP asymmetric key pair. The PSP public key is used by the wallet server 114 during the transaction for encrypting the payment transaction data prior to sending the data to the proxy server 124. This is explained in detail with reference to FIG. 5 later. In an example embodiment, the UI 300b may also display a form field (not shown) using which the merchant needs to set up an encryption key other than the PSP public key for sharing payment related information to various entities.

The UI 300b includes a button 340 labeled 'Register PSP'. The merchant upon entering the relevant information in the form fields 330 and 335 is enabled to click on the button 340 to complete the registration of the PSP on behalf of the PSP. This is a one-time process followed by the merchant or the PSP on the merchant portal 305. In an example embodiment, the merchant is further enabled to link one or more PSPs of its choice from the merchant portal 305 to the merchant profile for processing particular payment transactions. This is explained hereinafter in detail with reference to FIG. 4.

Figure 4:
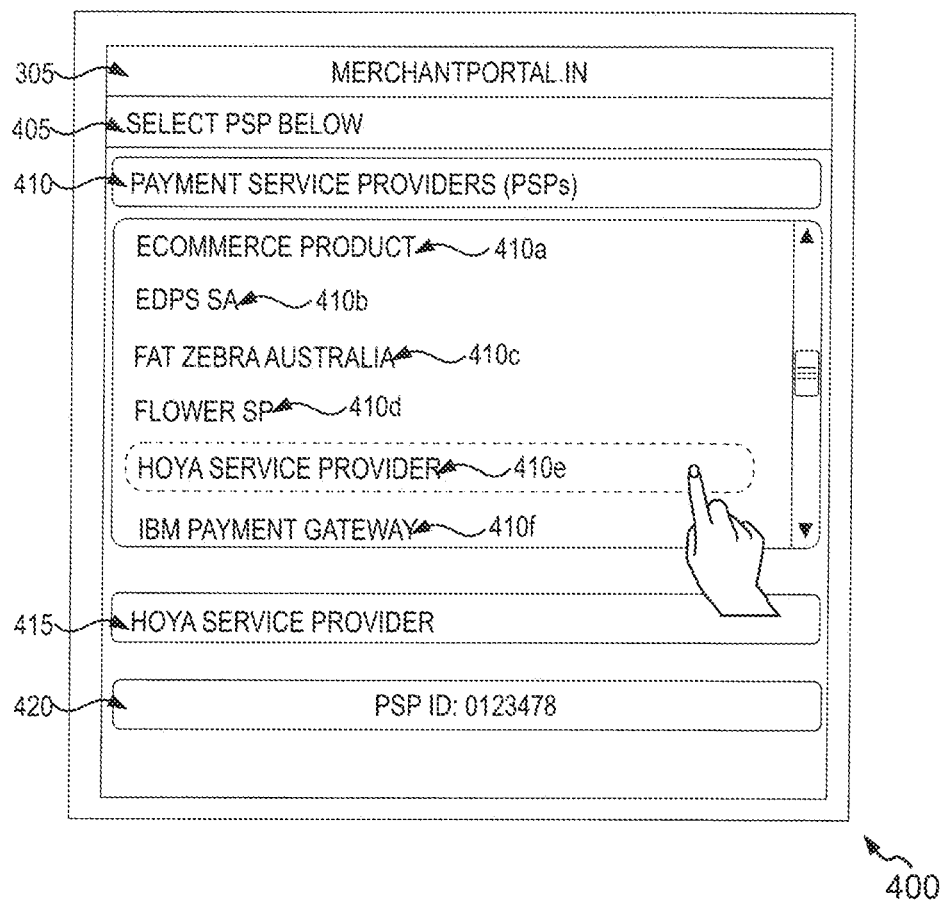
FIG. 4 represents a simplified schematic representation of an example UI of the merchant portal for linking one or more PSPs to a merchant profile, in accordance with an example embodiment.

FIG. 4 represents a simplified schematic representation of an example User Interface (UI) 400 of the merchant portal 305 for linking one or more PSPs to a merchant profile, in accordance with an example embodiment. The merchant portal 305 includes a header 405 displaying text 'select PSP below' accompanied by a scroll down list 410 of a plurality of PSPs (hereinafter alternatively referred to as a PSP list 410). The PSP list 410 includes a plurality of PSPs such as 'Ecommerce product' 410a, 'EDPS SA' 410b, 'Fat Zebra, Australia' 410c, 'FlowerSP' 410d, 'Hoya service provider' 410e, and 'IBM payment gateway' 410f. As explained with reference to FIGS. 3A and 3B, these PSPs may be registered on the merchant portal 305 by one or more different merchants or by the PSPs themselves. Each PSP from the PSP list 410 is configured to register the unique URL on the merchant portal 305 for being able to process the future payment transactions.

The 'Hoya service provider' 410e is shown to be selected by the user/the merchant as a preferred PSP for processing one or more of the future payment transactions. An information field 415 on the UI 400 represents the selected PSP as 'Hoya service provider' 410e. The selection of the PSPs results in linking those PSPs to the merchant profile. In at least one embodiment, the merchant portal 305 is configured to generate a respective PSP ID for the PSP linked to the merchant profile. An information field 420 on the UI 400 represents a PSP ID generated for the PSP 'Hoya service provider' 410e as '0123478'. In various embodiments, the merchant is able to select a plurality of PSPs from the PSP list 410 as the preferred PSPs and thereby link those PSPs to the merchant profile. Accordingly, the merchant portal 305 is configured to generate a plurality of PSP IDs each of which uniquely identifies the linked PSP.

In an embodiment, each PSP ID of each PSP is stored against a corresponding URL of each PSP in a merchant portal database. In an example embodiment, the merchant portal 305 is configured to generate a transaction ID for the reference of the merchant to process the on-behalf payment transaction using the PSP. For example, if the merchant does not want a particular PSP to process the payment transaction for every single transaction but rather wants that PSP to process a bulk of payment transactions, the transaction ID can be utilized for retrieving such details and modifying the merchant preferences. In at least one embodiment, the wallet server 114 is configured to fetch the URL of the PSP from the merchant portal database using the information field 420 (which may include a PSP ID) during an actual payment transaction and send the URL along with the payment transaction data to the proxy server 124. This is explained in detail hereinafter with reference to FIG. 5.

Figure 5:
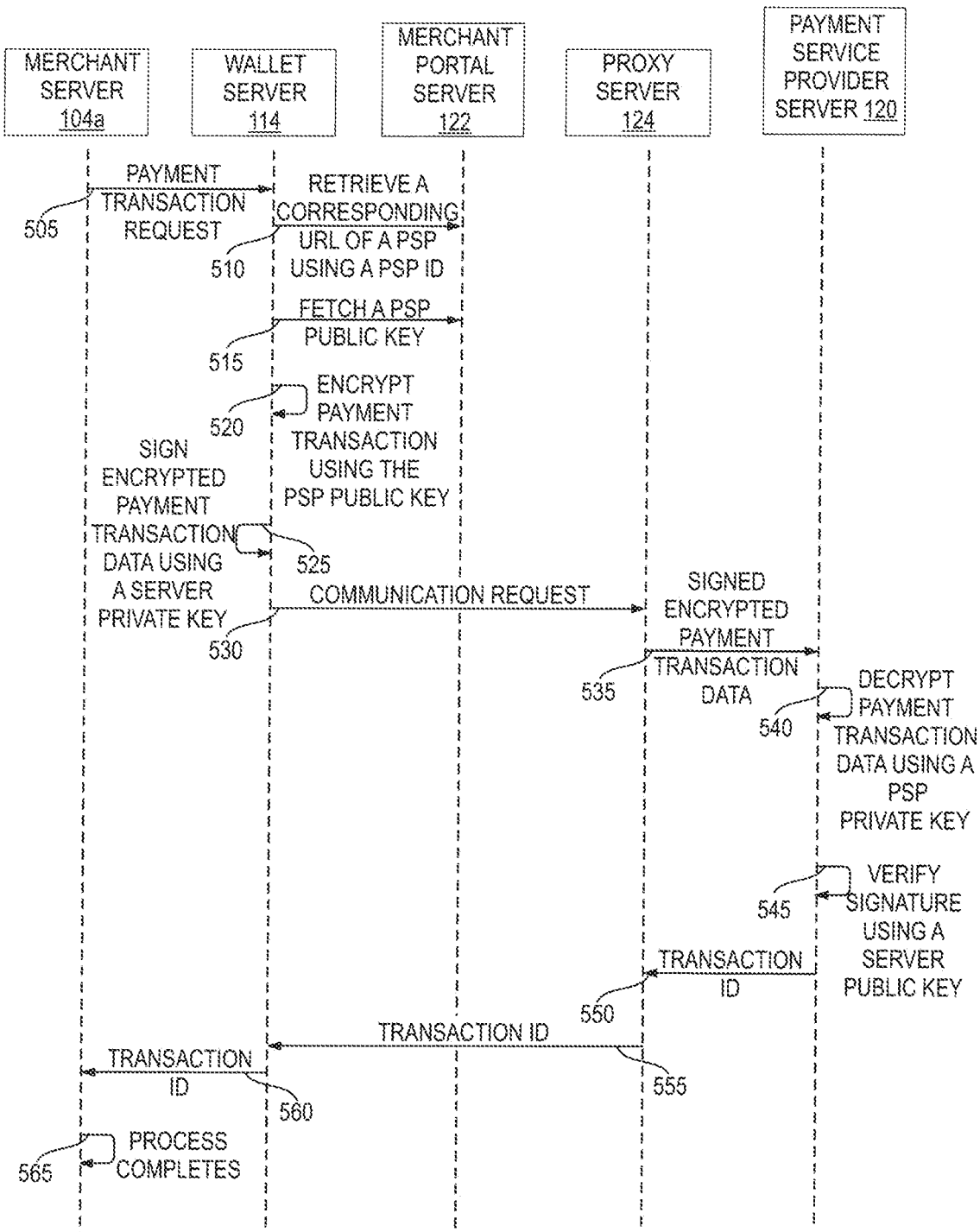
FIG. 5 represents a sequence flow diagram for pushing payment transaction data to a PSP, in accordance with an example embodiment.

FIG. 5 represents a sequence flow diagram 500 for pushing payment transaction data to a PSP, in accordance with an example embodiment. The sequence of operations of the flow diagram 500 may not be necessarily executed in the same order as they are presented. Further, one or more operations may be grouped together and performed in form of a single step, or one operation may have several sub-steps that may be performed in parallel or in sequential manner.

At 505, the merchant server 104a sends a payment transaction request to the wallet server 114. The payment transaction request includes the payment transaction data (e.g., the amount payable) and the PSP ID of the PSP preferred by the merchant for processing the current payment transaction. The payment transaction request may further include other parameters such as, but not limited to, a checkout ID, a unique cart ID, a callback URL of the merchant server 104a, a transaction amount, a currency and the like.

At 510, the wallet server 114 retrieves the corresponding URL of the PSP from the merchant portal database associated with the merchant portal server 122 using the PSP ID received in the payment transaction request. As explained with reference to the foregoing FIGS. 2-4, the PSP is already pre-registered on the merchant portal associated with the payment network 145 by providing the URL. Further, the URL is stored against the PSP ID pre-generated based on linking the registered PSP with the merchant profile.

At 515, the wallet server 114 fetches a PSP public key from the merchant portal server 122. As explained with reference to FIG. 4, the PSP public key is also entered on the merchant portal at the time of registering the PSP by the merchant or the PSP itself.

At 520, the wallet server 114 is configured to encrypt the payment transaction data using the PSP public key. In an example embodiment, the payment transaction data may be encrypted using a symmetric key encryption. The Advanced Encryption Standard (AES) algorithm may be applied for symmetric key encryption. The symmetric key may further be encrypted using an asymmetric key encryption. The PSP public key may be used for encrypting the symmetric key for asymmetric key encryption. In another example embodiment, the payment transaction data may be encrypted using the Standard JSON Web Encryption (JWE) algorithm and the PSP public key may be used to encrypt the payment transaction data.

At 525, the wallet server 114 signs the encrypted payment transaction data using a server private key being part of a server asymmetric key pair. In an example embodiment, the server asymmetric key pair may be generated by the wallet server 114. In another example embodiment, the server public key may be shared by the wallet server 114 to the PSP server 120 in advance via the proxy server 124. Alternatively, the wallet server 114 may send the server public key to the PSP server 120 via the merchant portal server 122. In an example embodiment, the wallet server 114 may get the encrypted payment transaction data signed by yet another entity of the payment network 145 providing Cryptography as a Service (CaaS). Further, in an example, a Rivest-Shamir-Adleman—Secure Hash Algorithm 256 (RSA-SHA256) algorithm may be applied for signing the encrypted payment transaction data.

At 530, the wallet server 114 sends a communication request to the proxy server 124. In an example embodiment, the proxy server 124 is an Extensible Markup Language (XML) gateway dynamic outbound proxy server. The communication request may be sent via '(https://)service(.)xmlgw(.)com' (omitting the parentheses) to the proxy server 124. In another example embodiment, the proxy server 124 is a JavaScript Object Notation (JSON) dynamic outbound proxy server. In an embodiment, the communication request includes a payload and a header. The payload includes the signed encrypted payment transaction data and the header includes the URL of the PSP. For example, the header includes the URL as 'psp-webhookurl: (https://)mypspserviceprovider(.)com(/)pspdata' (omitting the parentheses).

At 535, the proxy server 124 sends the signed encrypted payment transaction data to the PSP using the PSP end point. The proxy server 124 is configured to parse the communication request to extract the URL/PSP endpoint and send the signed encrypted payment transaction data to the PSP server 120.

At 540, the PSP server 120 is configured to decrypt the encrypted payment transaction data (i.e., the payload) using the PSP private key.

At 545, the PSP server 120 is configured to verify the signature of the signed encrypted payment transaction data using the server public key. Once the payload data is decrypted, the PSP server 120 creates an RSA-SHA256 digital signature from the contents using the server public key. The value generated is required to match the signature parameter to authenticate the payload and confirm the data has not been altered in any way during the transmission.

At 550, the PSP server 120 sends a transaction ID generated based on processing the payment transaction to the proxy server 124. Processing of the payment transaction includes, for example, sending the payment card information retrieved from the payment transaction data to the issuer server (e.g., the issuer server 116 of FIG. 1) for authorization. The issuer server verifies whether the user's payment account (i.e. the issuer account) is in good standing and whether the prospective purchase is covered by the user's available credit line or account balance. If the account holds enough balance amount, the issuer server debits the exact number of transaction amount from the account and notifies the PSP server 120 and/or the acquirer server (e.g., the acquirer server 118 of FIG. 1) of successful authorization. Thereafter, the PSP server 120 generated the transaction ID of the processed payment transaction for the reference of the merchant.

At 555, the proxy server 124 forwards the transaction ID to the wallet server 114. At 560, the wallet server 114 sends the transaction ID to the merchant server 104a. The process completes at step 565.

The flow diagram 500 as explained with reference to FIG. 5 is specifically beneficial to a Non-PCI compliant merchant who is unauthorized to accept the payment transaction details of a consumer for processing the payment transaction. Using the wallet application as preferred payment method, the user initiates the payment transaction from the merchant application. The user selects the preferred payment card, billing details and shipping details on the wallet application. The communication management with the PSP, for the on-behalf payment transaction processing, is a cumbersome process for both the merchant and the wallet application specifically when a new PSP needs to process the payment transaction. As explained with reference to the flow diagram 500, the payment transaction data is sent to the PSP, be it a new or an existing one, dynamically during the payment transaction using the PSP endpoint. This eliminates the need of the merchant from interacting with the PSP for processing each transaction.

Figure 6:
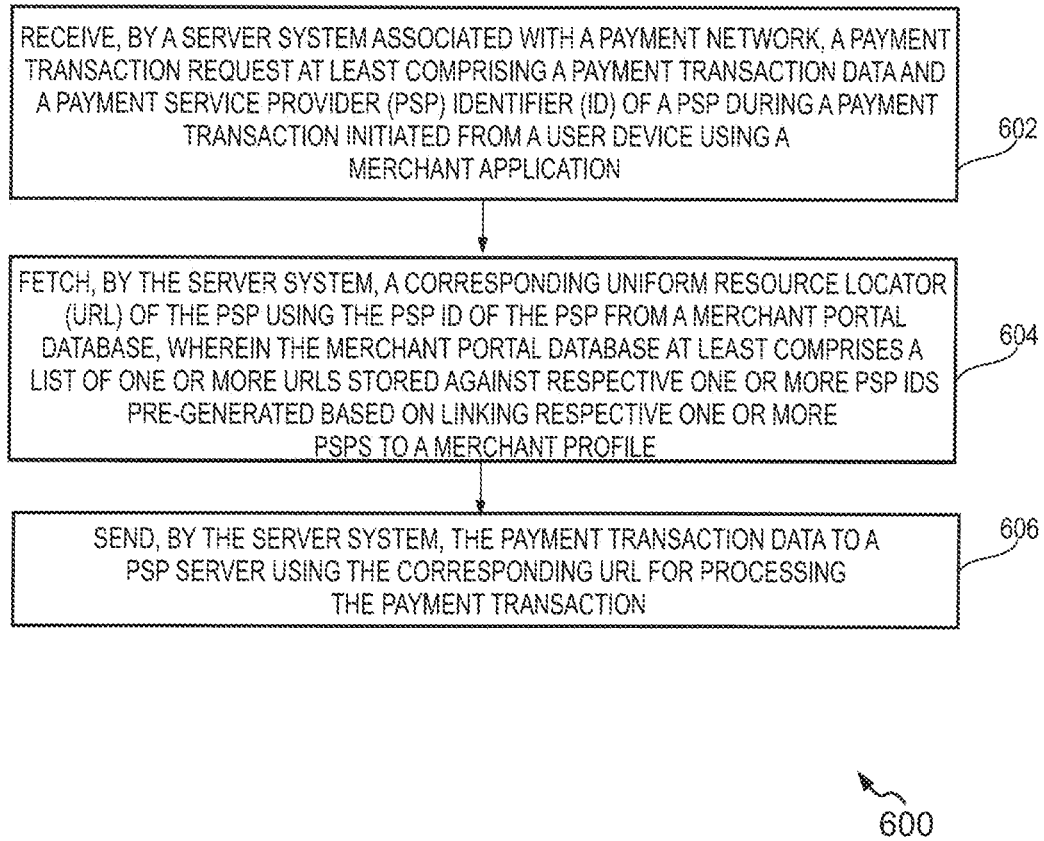
FIG. 6 represents a flow diagram of a method for pushing payment transaction data to a PSP, in accordance with an example embodiment.

FIG. 6 illustrates a flow diagram of a method 600 for pushing payment transaction data to a PSP, in accordance with an example embodiment. The method 600 depicted in the flow diagram may be executed by, for example, the at least one server system such as the wallet server 114. The operations of the flow diagram of the method 600, and combinations of operation in the flow diagram of the method 600, may be implemented by, for example, hardware, firmware, a processor, circuitry and/or a different device associated with the execution of software that includes one or more computer program instructions. The method 600 starts at operation 602.

At 602, the method 600 includes receiving, by a server system associated with a payment network, a payment transaction request at least including a payment transaction data and a PSP identifier (ID) of a PSP during a payment transaction initiated from a user device using a merchant application. As explained with reference to FIG. 1, the merchant application 104 facilitates a checkout page 106 on the user device 102 using which the user initiates a payment transaction for purchasing a product on the merchant application 104. The checkout page 106 also provisions a wallet application 108c (i.e., the ABC wallet 108c) for user selection to process the payment transaction using the wallet application 108c. The user selection of the wallet application 108c results in sending by the merchant server 104a the payment transaction request (i.e., the payment transaction data and the PSP ID) to the wallet server 114. Further, the merchant application is integrated with the wallet application based on creating the merchant profile by a merchant on a merchant portal facilitated by a merchant portal server.

At 604, the method 600 includes, fetching, by the server system, a corresponding Uniform Resource Locator (URL) of the PSP using the PSP ID of the PSP from a merchant portal database. The merchant portal database at least includes a list of one or more URLs stored against one or more PSP IDs pre-generated based on linking respective one or more PSPs to a merchant profile. The server system, being the wallet server, is configured to fetch the pre-registered URL of the PSP using the PSP ID from the merchant portal database. The merchant portal database also includes a PSP public key to be fetched by the wallet server for encrypting the payment transaction data prior to transmission to the other entity.

At 606, the method 600 includes sending, by the server system, the payment transaction data to a PSP server associated with the PSP using the corresponding URL for processing the payment transaction. In an embodiment, the server system is configured to send the URL and the payment transaction data to the proxy server 124 associated with the payment network 145 and the proxy server 124 forwards the payment transaction data to the PSP server 120 for processing the payment transaction as explained with reference to FIG. 1. The method 600 ends at operation 606. Unlike the existing conventional flow, i.e., where the PSP needs to communicate to the wallet server using a transaction ID provided by the merchant to pull the payment transaction data from the wallet server, the wallet server communicates to the PSP by dynamically pushing the payment transaction data to process the payment transaction. Thereby, from a roundabout communication between the entities, one communication call is avoided and thereby the payment transaction process is simplified.

Figure 7:
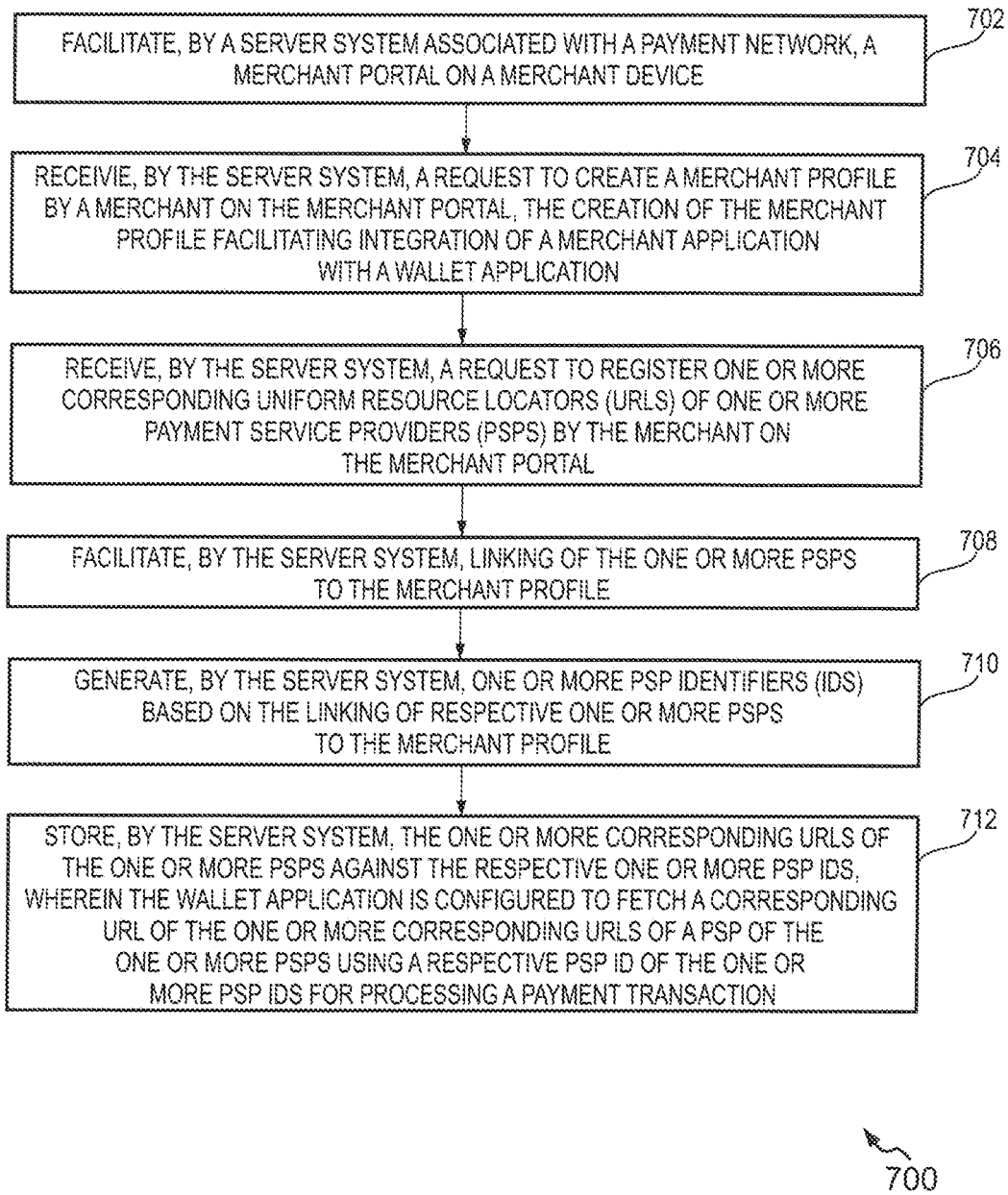
FIG. 7 represents a flow diagram of another method for pushing payment transaction data to a PSP, in accordance with an example embodiment.

FIG. 7 illustrates a flow diagram of another method 700 for pushing payment transaction data to a PSP, in accordance with an example embodiment. The method 700 depicted in the flow diagram may be executed by, for example, the at least one server system such as the merchant portal server 122. The operations of the flow diagram of the method 700, and combinations of operation in the flow diagram of the method 700, may be implemented by, for example, hardware, firmware, a processor, circuitry and/or a different device associated with the execution of software that includes one or more computer program instructions. The method 700 starts at operation 702.

At 702, the method 700 facilitating, by a server system associated with a payment network, a merchant portal on a merchant device. The merchant portal is an exemplary UI provisioned by the merchant portal server on the merchant device. The merchant portal server is an example of the server system associated with the payment network.

At 704, the method 700 includes, receiving, by the server system, a request to create a merchant profile by a merchant on the merchant portal. The creation of the merchant profile facilitates integration of a merchant application with a wallet application.

At 706, the method 700 includes receiving, by the server system, a request to register one or more corresponding Uniform Resource Locators (URLs) of one or more PSPs by the merchant on the merchant portal. This is explained earlier in detail with reference to FIGS. 3A and 3B.

At 708, the method 700 includes, facilitating, by the server system, linking of the one or more PSPs to the merchant profile.

At 710, the method 700 includes, generating, by the server system, one or more PSP identifiers (IDs) based on the linking of respective one or more PSPs to the merchant profile. This is explained earlier in detail with reference to FIG. 4.

At 712, the method 700 includes, storing, by the server system, the one or more corresponding URLs of the one or more PSPs against the one or more PSP IDs. The wallet application is configured to fetch a corresponding URL of the one or more corresponding URLs of a PSP of the one or more PSPs using a respective PSP ID of the one or more PSP IDs for processing a payment transaction. This is explained earlier in detail with reference to FIG. 5. The method 700 ends at operation 712.

Figure 8:
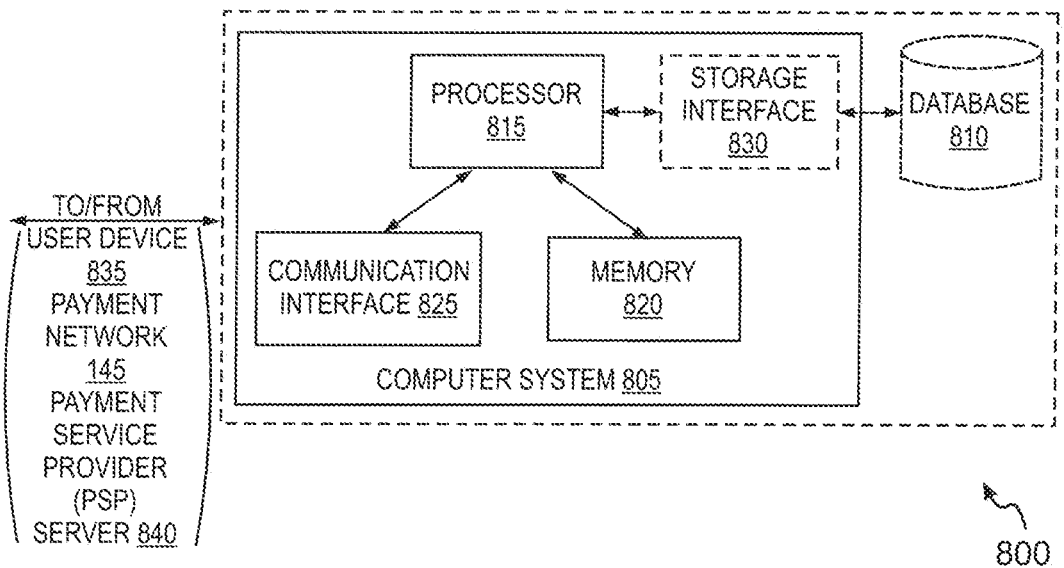
FIG. 8 represents a simplified block diagram of a server system, in accordance with one embodiment of the present disclosure.

FIG. 8 is a simplified block diagram of a server system 800, in accordance with one embodiment of the present disclosure. The server system 800 is an example of a server system that includes the wallet server 114 in the payment network 145 communicatively connected to the merchant portal server 122 and proxy server 124 of FIG. 1. The server system 800 includes a computer system 805, and a database 810. The computer system 805 includes a processor 815 for executing instructions. Instructions may be stored in, for example, but not limited to, a memory 820. The processor 815 may include one or more processing units (e.g., in a multi-core configuration). The processor 815 is operatively coupled to a communication interface 825 such that the computer system 805 can communicate with a remote device such as a user device 835 (e.g., the user device 102) or a PSP server 840 (e.g., the PSP server 120) or any entity within the payment network 145. For example, the communication interface 825 may receive a payment transaction request from the user device 835.

The processor 815 may also be operatively coupled to the database 810. The database 810 is any computer-operated hardware suitable for storing and/or retrieving data. The database 810 may include multiple storage units such as hard disks and/or solid-state disks in a redundant array of inexpensive disks (RAID) configuration. The database 810 may include, but not limited to, a storage area network (SAN) and/or a network attached storage (NAS) system. In some embodiments, the database 810 is integrated within the computer system 805. For example, the computer system 805 may include one or more hard disk drives as the database 810. In other embodiments, the database 810 is external to the computer system 805 and may be accessed by the computer system 805 using a storage interface 830. The storage interface 830 is any component capable of providing the processor 815 with access to the database 810. The storage interface 830 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 815 with access to the database 810.

The processor 815 is configured to facilitate processing of the payment transaction request upon successfully fetching a webhook URL of a PSP from a merchant portal server (e.g., the merchant portal server 122 of FIG. 1) using a PSP ID received in the payment transaction request from the user device 835. The processor 815 is configured to encrypt the payment transaction data for transmission to the PSP server 840 via a proxy server (e.g., the proxy server 124 of FIG. 1). In an embodiment, the processor 815 is further configured to send the encrypted payment transaction data and the URL to the proxy server via the communication interface 825. In an embodiment, the communication interface 825 is capable of facilitating operative communication with a proxy server using Application Program Interface (API) calls. For example, a Representational State Transfer (REST) API call may be made over Hyper Text Transfer Protocol (HTTP). The communication may be achieved over a communication network, such as the communication network 150. In another embodiment, the processor 815 is configured to send the encrypted payment transaction data and the URL to the PSP server 840 via the communication interface 825.

The components of the server system 800 provided herein may not be exhaustive, and that the server system 800 may include more or fewer components than that of depicted in FIG. 8. Further, two or more components may be embodied in one single component, and/or one component may be configured using multiple sub-components to achieve the desired functionalities. Some components of the server system 800 may be configured using hardware elements, software elements, firmware elements and/or a combination thereof.

Figure 9:
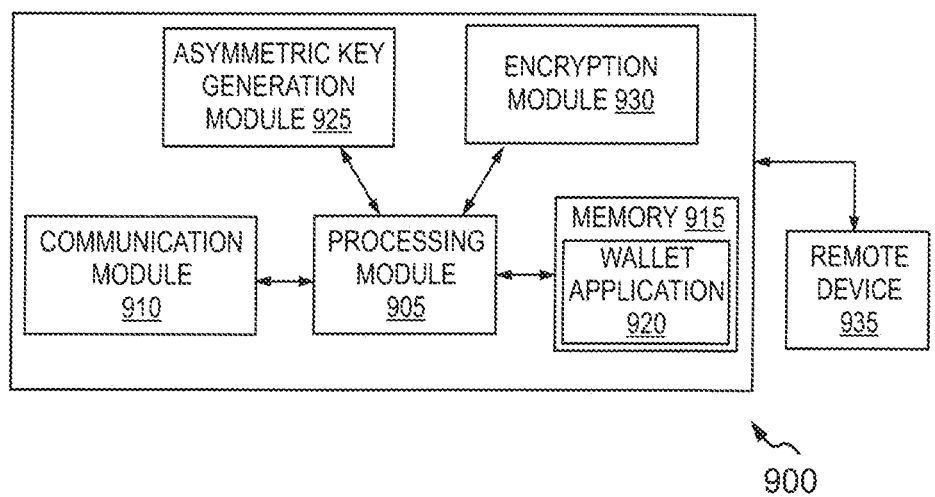
FIG. 9 represents a simplified block diagram of a wallet server, in accordance with one embodiment of the present disclosure.

FIG. 9 is a simplified block diagram of a wallet server 900, in accordance with one embodiment of the present disclosure. The wallet server 900 is an example of a wallet server 114 of FIG. 1. The wallet server 900 facilitates a wallet application 920 to provide its registered users storage of their payment cards on digital platform so as to make card-less payments. As explained with reference to FIG. 1, the wallet server 114 is associated with a payment network 145. The payment network 145 may be used by the merchant server 104a, the proxy server 124, the PSP server 120, the issuer server 116, the merchant portal server 122 and the acquirer server 118 as a payment interchange network. Examples of the payment interchange network include, but not limited to, Mastercard® payment system interchange network.

The wallet server 900 includes at least one processing module 905 communicably coupled to a communication module 910, at least one memory 915, an asymmetric key generation module 925 and an encryption module 930. In at least one embodiment, the wallet server 900 may be accessible to remote devices, such as a remote device 935, through a communication network, such as the communication network 150 or the payment network 145.

The processing module 905 is capable of executing the stored machine executable instructions of a wallet application 920 (e.g., ABC wallet 108c of FIG. 1) in the memory 915 or within the processing module 905 or any storage location accessible to the processing module 905. In an embodiment, the processing module 905 is capable of executing the stored machine executable instructions of a merchant portal application (e.g., the merchant portal 305 of FIGS. 3A and 3B) in the memory 915 or within the processing module 905. The merchant portal application facilitates integration of a merchant application with the wallet application 920.

The processing module 905 is configured to perform the various operations as explained with reference to method 600. For example, the processing module 905 is configured to receive the payment transaction request from a user device such as the user device 835 of a user via the communication module 910 for processing a payment transaction initiated using a merchant application (e.g., the merchant application 104 of FIG. 1) integrated with the wallet application 920. The processing module 905 is configured to retrieve the PSP endpoint using a PSP ID received in the payment transaction request.

The processing module 905, in conjunction with the encryption module 930, is configured to encrypt the payment transaction data using a PSP public key of the PSP. The PSP public key is fetched using the communication module 910 from a merchant portal database. The encryption module 930 includes one or more encryption algorithms to be used by the processing module 905, such as, but not limited to, Diffie-Hellman key agreement algorithm, Advanced Encryption Standard (AES), Data Encryption Standard (DES), Elliptic Curve Cryptography (ECC), El Gamal, and the like. The processing module 905, in conjunction with the asymmetric key generation module 925, is configured to generate a server asymmetric key pair. The server public key is shared with the PSP server 840. The server private key is used by the processing module 905 to sign the encrypted payment transaction data. One or more signing algorithms such as, but not limited to, Digital Signature Algorithm (DSA), Secure Hash Algorithm 1 (Sha1), Secure Hash Algorithm 3 (Sha3) etc. may be applied to sign the encrypted payment transaction data. The asymmetric key generation module 925 includes one or more algorithms such as Rivest-Shamir-Adleman (RSA) algorithm. The RSA algorithm involves operations such as key generation, key distribution, encryption and decryption.

In an embodiment, the processing module 905 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like In an embodiment, the wallet server 900 may include an input/output module (I/O module) (not shown) configured to receive inputs from (e.g., for selection of preferred payment card and shipping details) and provide outputs to the end-user (i.e. the merchant and/or the users) of the wallet application 920. For instance, the I/O module may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a UI display (such as a light emitting diode display, a thin-film transistor (TFT) display, a liquid crystal display, an active-matrix organic light-emitting diode (AMOLED) display, etc.), a speaker, a ringer, a vibrator, and the like.

The memory 915 can be any type of storage accessible to the processing module 905. The memory 915 includes program instructions for facilitating the wallet application 920. For example, the memory 915 may include volatile or non-volatile memories, or a combination thereof. In some non-limiting examples, the memory 915 can be four to sixty-four Megabytes (MB) of Dynamic Random Access Memory ("DRAM") or Static Random Access Memory ("SRAM"). In addition, some examples may include supplementary flash memory installed via a PCMCIA slot.

The communication module 910 is further configured to cause display of user interfaces on the remote device 935 (e.g., the user device 835 or the user device 102). In one embodiment, the communication module 910 includes a transceiver for wirelessly communicating information to, or receiving information from, the remote device 935 (e.g., the proxy server 124, the merchant portal server 122, the merchant server 104a, the user device 835, the PSP server 840 etc.) or other suitable display device, and/or another type of remote processing device. In another embodiment, the communication module 910 is capable of facilitating operative communication with the remote devices and a cloud server using Application Program Interface (API) calls. The communication may be achieved over a communication network, such as the communication network 150.

Figure 10:
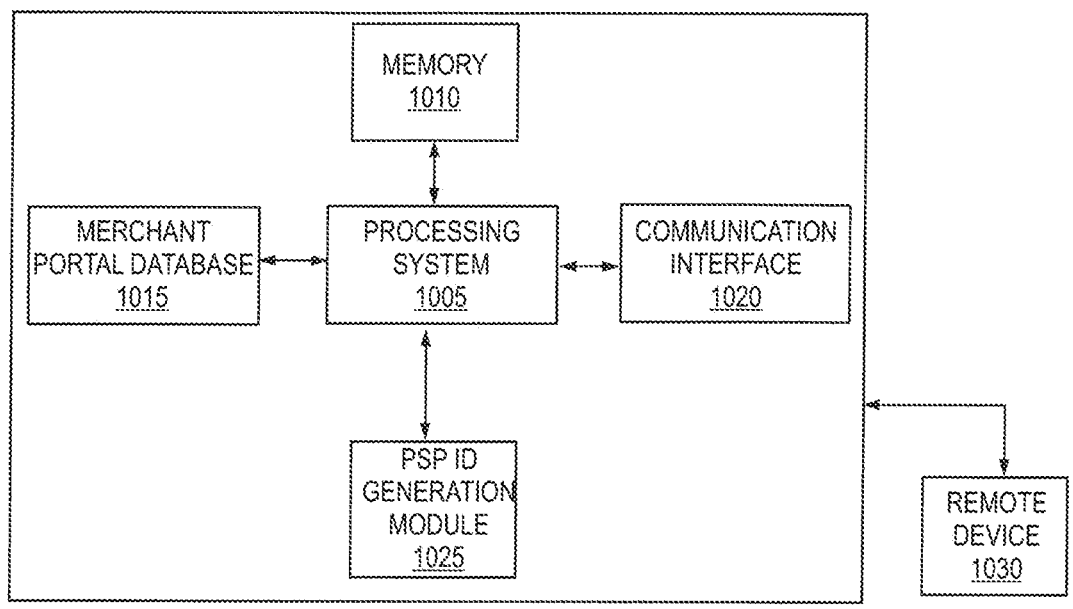
FIG. 10 represents a simplified block diagram of a merchant portal server, in accordance with one embodiment of the present disclosure.

FIG. 10 is a simplified block diagram of a merchant server 1000, in accordance with one embodiment of the present disclosure. The merchant portal server 1000 may correspond to the merchant portal server 122 of FIG. 1. As explained with reference to FIG. 1, the merchant portal server 122 is associated with a payment network 145. The merchant portal server 1000 includes a processing system 1005 configured to extract programming instructions from a memory 1010 to provide various features of the present disclosure. The components of the merchant portal server 1000 provided herein may not be exhaustive, and that the merchant portal server 1000 may include more or fewer components than that of depicted in FIG. 10. Further, two or more components may be embodied in one single component, and/or one component may be configured using multiple sub-components to achieve the desired functionalities. Some components of the merchant portal server 1000 may be configured using hardware elements, software elements, firmware elements and/or a combination thereof.

Via a communication interface 1020, the processing system 1005 receives a request to register/onboard from a remote device 1030 such as a merchant server 104a and/or a PSP server 120 of FIG. 1. The communication may be achieved through API calls, without loss of generality. A merchant database 1015 is operatively coupled to the processing system 1005. The merchant database 1015 includes a listing of one or more PSPs with their corresponding unique URLs and respective PSP IDs along with the respective one or more PSP public keys. The merchant database 1015 further includes a listing of merchants, merchant IDs, a merchant primary account number (PAN), a merchant name, a merchant category code (MCC), a merchant city, a merchant postal code, a merchant brand name, a PSP primary account number (PAN), a PSP name, a PSP category code, a PSP city, a PSP postal code, a PSP brand name, and the like.

Via the communication interface 1020, the processing system 1005 is further configured to cause display of user interfaces on the remote device 1030 (e.g., a merchant device, or a PSP device). Using the UIs, the merchant is enabled to create a merchant profile on the merchant portal. This further results in integration of the merchant application with the wallet application 920 to process the payment transaction by the wallet application 920. The merchant or an authorized user of the PSP are enabled to register the PSP on the merchant portal/UI by providing the unique webhook URL of the PSP. The merchant is further enabled to link one or more preferred PSPs with the merchant profile for processing future payment transactions. Using a PSP ID generation module 1025, the processing system 1005 is configured to generate a PSP ID for a PSP linked to the merchant profile. The processing system 1005 is further configured to provide information such as the PSP ID, the PSP public key, the webhook URL etc. by fetching them from the merchant database 1015 based on the request received from the wallet server 900 via the communication interface 1020.

Figure 11:
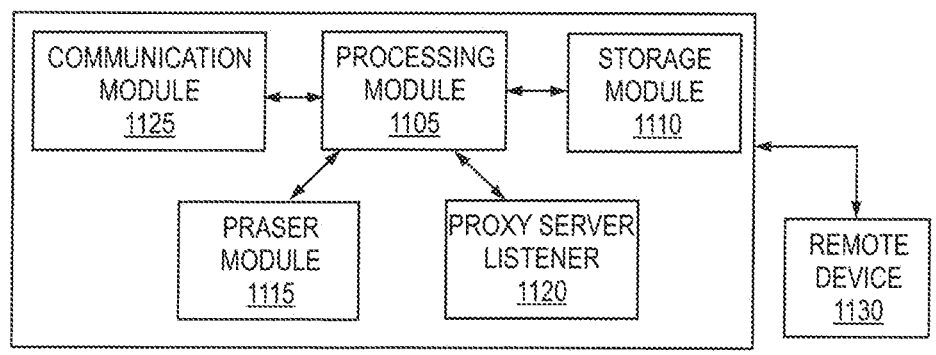
FIG. 11 represents a simplified block diagram of a proxy server, in accordance with one embodiment of the present disclosure.

FIG. 11 is a simplified block diagram of a proxy server 1100, in accordance with one embodiment of the present disclosure. The proxy server 1100 is an example of the proxy server 124 of FIG. 1. The proxy server 124 is associated with the payment network 145 of FIG. 1. The proxy server 1100 includes a processing module 1105 operatively coupled to a storage module 1110, a parser module 1115, a proxy server listener 1120, and a communication module 1125. The components of the proxy server 1100 provided herein may not be exhaustive, and that the proxy server 1100 may include more or fewer components than that of depicted in FIG. 11. Further, two or more components may be embodied in one single component, and/or one component may be configured using multiple sub-components to achieve the desired functionalities. Some components of the proxy server 1100 may be configured using hardware elements, software elements, firmware elements and/or a combination thereof.

The storage module 1110 is configured to store machine executable instructions to be accessed by the processing module 1105. Additionally, the storage module 1110 stores information related to, one or more PSPs and their respective URLs. Via the communication module 1125, the processing module 1105 is configured to facilitate basic functionalities such as firewall and network data filtering, network connection sharing, data caching and the like to the client (i.e., the wallet server 900 or the wallet server 114). In an embodiment, the proxy server listener 1120 may be a port (i.e., an example of the communication module 1125) where new communication request (e.g., '(https://)service(.)xmlgw(.)com' (omitting the parentheses)) from the wallet server 900/client browser is listened. Additionally, the proxy server listener 1120 also performs blocking of clients from the list given by the user. The processing module 1105 is configured to read the communication request from the header. Using the parser module 1115, the communication request is parsed by the processing module 1105 to extract the URL of the PSP from the communication request. The processing module 1105 further checks if the URL is blocked or not. Upon checking, the processing module 1105 generates a connection with a remote device 1130, for example, a PSP server (e.g., the PSP server 120 or the PSP server 840) using the communication module 1125. The processing module 1105 sends the encrypted payment data to the PSP server using the URL. Further, the processing module 1105 also receives a transaction ID of the processed payment transaction from the PSP server via the communication module 1125.

Figure 12:
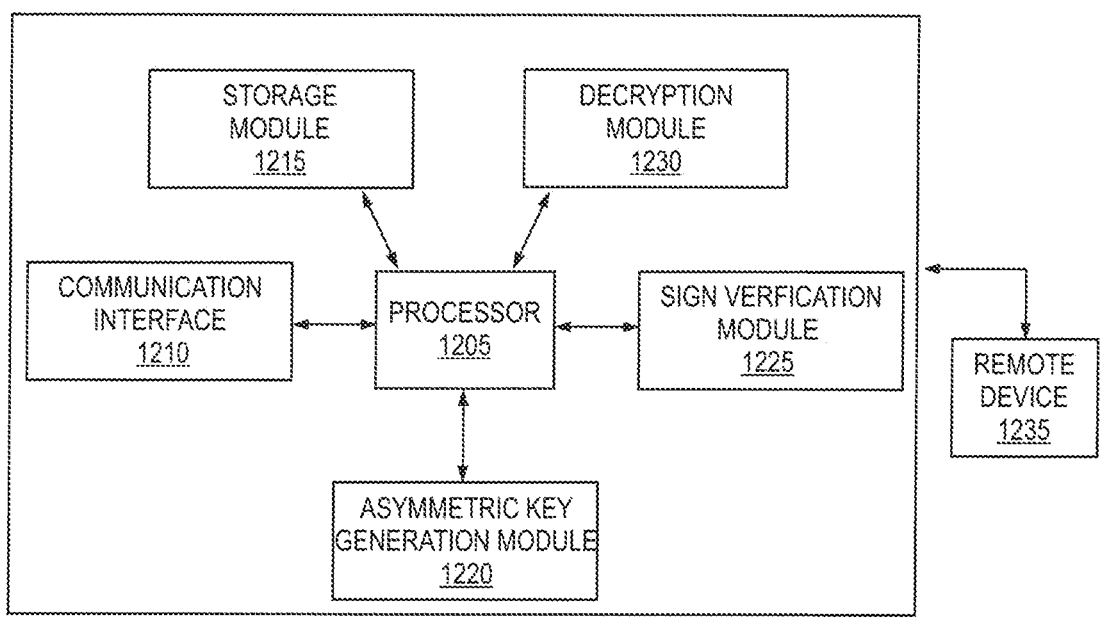
FIG. 12 represents a simplified block diagram of a payment service provider server, in accordance with one embodiment of the present disclosure.

FIG. 12 is a simplified block diagram of a Payment Service Provider (PSP) server 1200, in accordance with one embodiment of the present disclosure. Typically, a PSP can connect to multiple acquiring banks, card, and payment networks. In many cases, the PSP fully manages these technical connections, relationships with the external network, and bank accounts. This makes the merchant less dependent on financial institutions and free from the task of establishing these connections directly. The PSP server 1200 includes at least one processor 1205 communicably coupled to a communication interface 1210, a storage module 1215, an asymmetric key generation module 1220, a sign verification module 1225, and a decryption module 1230. In at least one embodiment, the PSP server 1200 may be accessible to remote devices, such as a remote device 1235 (e.g., the proxy server 1100, merchant server 104a, merchant portal server 1000, the wallet server 900 etc.), through a communication network, such as the communication network 150.

The processor 1205 is capable of executing the stored machine executable instructions in the storage module 1215 or within the processor 1205 or any storage location accessible to the processor 1205. The asymmetric key generation module 1220 includes one or more algorithms such as RSA and ElGamal encryption to generate the PSP asymmetric key pair. In an embodiment, the processor 1205 is configured to apply Diffie-Hellman key agreement algorithm to securely share the PSP public key with the merchant portal server 1000 via the communication interface 1210. The sign verification module 1225 includes one or more applicable algorithms such as Digital Signature Algorithm (DSA), ElGamal signature scheme and the like to verify the signature of the encrypted payment data received from the proxy server 1100 using the server public key of the wallet server 900. The decryption module 1230 includes one or more decryption algorithms to decrypt the encrypted payment transaction data using the PSP private key. The processor 1205 sends the payment transaction data to an issuer server such as the issuer server 116 of FIG. 1 via the communication interface 1210 to process the payment transaction.

In an embodiment, the issuer server (e.g., the issuer server 116 of FIG. 1) is configured to validate the payment card information based on verifying the PIN (e.g., whether the four-digit numeric code matches the PIN issued by the issuer), the sufficient funds in the issuer account and the like. Upon successful authorization of the payment card information and the cardholder only, the payment transaction is processed further by debiting the transaction amount from the issuer account of the user. The PSP server 1200 is communicated by the issuer server of the processed payment. The processor 1205 is configured to generate a transaction ID based on processing the payment transaction. The processor 1205 is further configured to store the transaction ID in the storage module 1215 and send the transaction ID to the proxy server 1100. The communication interface 1210 is capable of facilitating such operative communication with the remote device 1235 and cloud servers using API calls.

Figure 13:
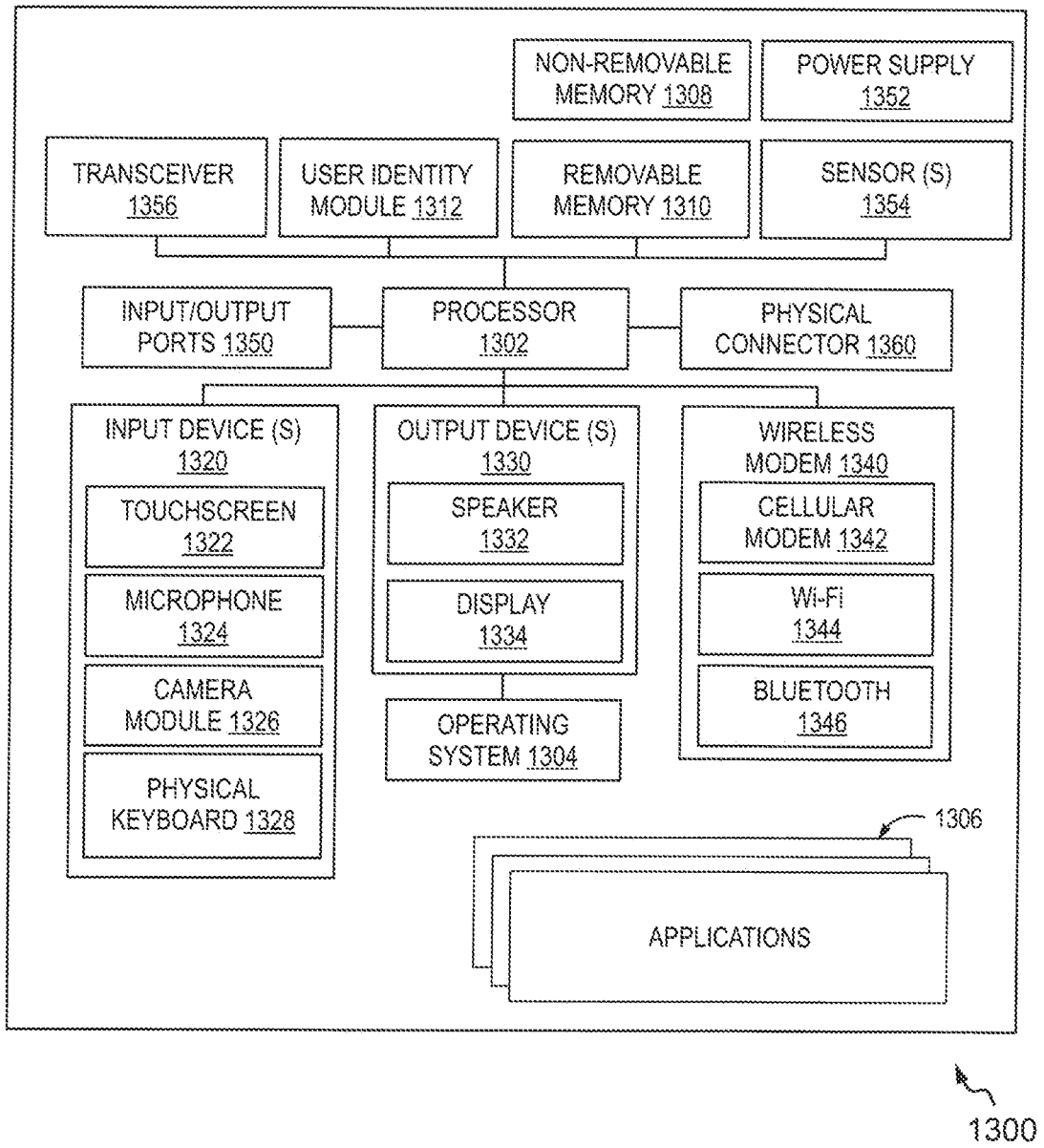
FIG. 13 represents a simplified block diagram of a user device capable of implementing at least some embodiments of the present disclosure.

FIG. 13 shows simplified block diagram of a client device 1300 capable of implementing at least some embodiments of the present disclosure. For example, the client device 1300 may run the merchant application 104 hosted by the merchant server 104a of FIG. 1. The client device 1300 may also run the wallet application 920 hosted by the wallet server 900 of FIG. 9. The client device 1300 is depicted to include one or more applications 1306.

It should be understood that the client device 1300 as illustrated and hereinafter described is merely illustrative of one type of device and should not be taken to limit the scope of the embodiments. As such, it should be appreciated that at least some of the components described below in connection with that the client device 1300 may be optional and thus in an example embodiment may include more, less or different components than those described in connection with the example embodiment of the FIG. 13. As such, among other examples, that the client device 1300 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated client device 1300 includes a controller or a processor 1302 (e.g., a signal processor, microprocessor, ASIC, or other control and processing logic circuitry) for performing such tasks as signal coding, data processing, image processing, input/output processing, power control, and/or other functions. An operating system 1304 controls the allocation and usage of the components of the client device 1300 and support for one or more applications programs (see, the applications 1306), that implement one or more of the innovative features described herein. The applications 1306 may include e-commerce application, payment-based application and/or any common mobile computing applications (e.g., telephony applications, email applications, calendars, contact managers, web browsers, messaging applications) or any other computing application.

The illustrated client device 1300 includes one or more memory components, for example, a non-removable memory 1308 and/or a removable memory 1310. The non-removable memory 1308 and/or the removable memory 1310 may be collectively known as database in an embodiment. The non-removable memory 1308 can include RAM, ROM, flash memory, a hard disk, or other well-known memory storage technologies. The removable memory 1310 can include flash memory, smart cards, or a Subscriber Identity Module (SIM). The one or more memory components can be used for storing data and/or code for running the operating system 1304 and the applications 1306. The client device 1300 may further include a user identity module (UIM) 1312. The UIM 1312 may be a memory device having a processor built in. The UIM 1312 may include, for example, a subscriber identity module (SIM), a universal integrated circuit card (UICC), a universal subscriber identity module (USIM), a removable user identity module (R-UIM), or any other smart card. The UIM 1312 typically stores information elements related to a mobile subscriber. The UIM 1312 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The client device 1300 can support one or more input devices 1320 and one or more output devices 1330. The input devices 1320 and the output devices 1330 configure the input/output (I/O) module for the client device 1300. Examples of the input devices 1320 may include, but are not limited to, a touch screen/a display screen 1322 (e.g., capable of capturing finger tap inputs, finger gesture inputs, multi-finger tap inputs, multi-finger gesture inputs, or keystroke inputs from a virtual keyboard or keypad), a microphone 1324 (e.g., capable of capturing voice input), a camera module 1326 (e.g., capable of capturing still picture images and/or video images) and a physical keyboard 1328. Examples of the output devices 1330 may include, but are not limited to, a speaker 1332 and a display 1334. Other possible output devices can include piezoelectric or other haptic output devices. Some devices can serve more than one input/output function. For example, the touch screen 1322 and the display 1334 can be combined into a single input/output device.

A wireless modem 1340 can be coupled to one or more antennas (not shown in the FIG. 12) and can support two-way communications between the processor 1302 and external devices, as is well understood in the art. The wireless modem 1340 is shown generically and can include, for example, a cellular modem 1342 for communicating at long range with the mobile communication network, a Wi-Fi compatible modem 1344 for communicating at short range with an external Bluetooth-equipped device or a local wireless data network or router, and/or a Bluetooth-compatible modem 1346. The wireless modem 1340 is typically configured for communication with one or more cellular networks, such as a GSM network for data and voice communications within a single cellular network, between cellular networks, or between the client device 1300 and a public switched telephone network (PSTN). The wireless modem 1340 may in at least one example embodiment configure the communication module of the client device 1300.

The client device 1300 can further include one or more input/output ports 1350, a power supply 1352, one or more sensors 1354 for example, an accelerometer, a gyroscope, a compass, or an infrared proximity sensor for detecting the orientation or motion of the client device 1300, a transceiver 1356 (for wirelessly transmitting analog or digital signals) and/or a physical connector 1360, which can be a USB port, IEEE 1294 (FireWire) port, and/or RS-232 port. The illustrated components are not required or all-inclusive, as any of the components shown can be deleted and other components can be added.

The disclosed methods with reference to FIGS. 6 and 7, or one or more operations of the methods 600 and 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 800 and its various components such as the computer system 805 and the database 810 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
receiving, by a server system associated with a payment network, a payment transaction request at least comprising a payment transaction data and a Payment Service Provider (PSP) identifier (ID) of a PSP during a payment transaction initiated from a user device using a merchant application;
fetching, by the server system, a corresponding Uniform Resource Locator (URL) of the PSP using the PSP ID of the PSP from a merchant portal database, wherein the merchant portal database at least comprises a list of one or more URLs stored against respective one or more PSP IDs pre-generated based on linking respective one or more PSPs to a merchant profile; and
sending, by the server system, the payment transaction data to a PSP server associated with the PSP using the corresponding URL for processing the payment transaction.

2. The method as claimed in claim 1, wherein the server system is a wallet server configured to facilitate a wallet application integrated with the merchant application for receiving the payment transaction request.

3. The method as claimed in claim 2, wherein the merchant application is integrated with the wallet application based on creating the merchant profile by a merchant on a merchant portal facilitated by a merchant portal server, wherein the merchant is a Non-Payment Card Industry (PCI) compliant merchant.

4. The method as claimed in claim 3, wherein each URL of the one or more URLs of the one or more PSPs is registered by the merchant on the merchant portal.

5. The method as claimed in claim 4, wherein each PSP of the one or more PSPs is configured to register corresponding each URL of the one or more URLs on the merchant portal.

6. The method as claimed in claim 1, wherein sending the payment transaction data to a PSP server using the corresponding URL for processing the payment transaction, further comprises:
fetching a PSP public key of the PSP from the merchant portal database;

encrypting the payment transaction data using the PSP public key; and signing the encrypted payment transaction data using a server private key.

7. The method as claimed in claim 6, further comprising:

sending a communication request to a proxy server, wherein the communication request comprises the signed encrypted payment transaction data and the corresponding URL of the PSP and wherein the proxy server is configured to:

parse the communication request to extract the corresponding URL of the PSP, and send the signed encrypted payment transaction data to the PSP server using the corresponding URL for processing the payment transaction.

8. The method as claimed in claim 7, wherein the server system is the PSP server and wherein processing the payment transaction further comprises:

verifying the signed encrypted payment transaction data using a server public key; and decrypting the encrypted payment transaction data using a PSP private key.

9. The method as claimed in claim 8, further comprising:

generating a transaction ID of the processed payment transaction; and sending the transaction ID to a merchant server.

10. A server system in a payment network, the server system comprising:

a communication interface configured to receive a payment transaction request at least comprising a payment transaction data and a Payment Service Provider (PSP) identifier (ID) of a PSP during a payment transaction initiated from a user device using a merchant application;

a memory comprising executable instructions; and a processor communicably coupled to the communication interface, the processor configured to execute the instructions to cause the server system to at least:

fetch a corresponding Uniform Resource Locator (URL) of the PSP using the PSP ID of the PSP from a merchant portal database, wherein the merchant portal database at least comprises a list of one or more URLs stored against respective one or more PSP IDs pre-generated based on linking respective one or more PSPs to a merchant profile; and send the payment transaction data to a PSP server associated with the PSP using the corresponding URL for processing the payment transaction.

11. The server system as claimed in claim 10, wherein the server system is a wallet server configured to facilitate a wallet application integrated with the merchant application for receiving the payment transaction request.

12. The server system as claimed in claim 11, wherein the merchant application is integrated with the wallet application based on creating the merchant profile by a merchant on a merchant portal facilitated by a merchant portal server, wherein the merchant is a Non-Payment Card Industry (PCI) compliant merchant.

13. The server system as claimed in claim 12, wherein each URL of the one or more URLs of the one or more PSPs is registered by the merchant on the merchant portal.

14. The server system as claimed in claim 13, wherein each PSP of the one or more PSPs is configured to register corresponding each URL of the one or more URLs on the merchant portal.

15. The server system as claimed in claim 10, wherein for sending the payment transaction data to a PSP server using the corresponding URL for processing the payment transaction, the server system is further caused to:

fetch a PSP public key of the PSP from the merchant portal database;

encrypt the payment transaction data using the PSP public key; and sign the encrypted payment transaction data using a server private key.

16. The server system as claimed in claim 15, wherein the server system is further caused to:

send a communication request to a proxy server, wherein the communication request comprises the signed encrypted payment transaction data and the corresponding URL of the PSP and wherein the proxy server is configured to:

parse the communication request to extract the corresponding URL of the PSP, and send the payment transaction data to the PSP server using the corresponding URL for processing the payment transaction.

17. The server system as claimed in claim 16, wherein the server system is the PSP server and wherein for processing the payment transaction, the server system is further caused to:

verify the signed encrypted payment transaction data using a server public key; and decrypt the encrypted payment transaction data using a PSP private key.

18. The server system as claimed in claim 17, wherein the server system is further caused to:

generate a transaction ID of the processed payment transaction; and send the transaction ID to a merchant server.

19. A computer-implemented method, comprising:

facilitating, by a server system associated with a payment network, a merchant portal on a merchant device;

receiving, by the server system, a request to create a merchant profile by a merchant on the merchant portal, the creation of the merchant profile facilitating integration of a merchant application with a wallet application;

receiving, by the server system, a request to register one or more corresponding Uniform Resource Locators (URLs) of one or more Payment Service Providers (PSPs) by the merchant on the merchant portal;

facilitating, by the server system, linking of the one or more PSPs to the merchant profile;

generating, by the server system, one or more PSP identifiers (IDs) based on the linking of respective one or more PSPs to the merchant profile; and storing, by the server system, the one or more corresponding URLs of the one or more PSPs against the respective one or more PSP IDs, wherein the wallet application is configured to fetch a corresponding URL of the one or more corresponding URLs of a PSP of the one or more PSPs using a respective PSP ID of the one or more PSP IDs for processing a payment transaction.

20. The method as claimed in claim 19, wherein each PSP of the one or more PSPs is configured to register corresponding each URL of the one or more URLs on the merchant portal.

* * * * *